(12) United States Patent
Anderson et al.

(10) Patent No.: US 7,007,418 B2
(45) Date of Patent: Mar. 7, 2006

(54) AUTOMOTIVE WINDOW NOVELTY FIGURE

(75) Inventors: Bette J. Anderson, De Pere, WI (US); John H. Cass, De Pere, WI (US)

(73) Assignee: Bette's Buddies, LLC, De Pere, WI (US)

( * ) Notice: Subject to any disclaimer, the term of this patent is extended or adjusted under 35 U.S.C. 154(b) by 0 days.

(21) Appl. No.: 10/440,865

(22) Filed: May 19, 2003

(65) Prior Publication Data

US 2003/0192217 A1   Oct. 16, 2003

Related U.S. Application Data

(63) Continuation-in-part of application No. 09/849,066, filed on May 4, 2001, now Pat. No. 6,578,300.

(51) Int. Cl.
   *G09F 21/04*   (2006.01)
(52) U.S. Cl. ............................. 40/591; 40/424; 428/31
(58) Field of Classification Search ................. 40/591, 40/424, 425, 593, 643, 644; 116/28 R, 42; 428/31
   See application file for complete search history.

(56) References Cited

U.S. PATENT DOCUMENTS

| | | | |
|---|---|---|---|
| 1,512,330 A | 10/1924 | Flanders | |
| 1,818,624 A | 8/1931 | Hover | |
| 1,832,789 A | 11/1931 | Polak | |
| 2,398,748 A | 4/1946 | Lange et al. | |
| 2,933,841 A * | 4/1960 | Lawlor | 40/591 |
| 3,791,336 A * | 2/1974 | Zdebski | 116/28 R |
| 4,352,461 A | 10/1982 | Orta et al. | |
| 4,546,562 A | 10/1985 | Jones | |
| 4,872,278 A | 10/1989 | Ross et al. | |
| 4,884,524 A * | 12/1989 | Minotti | 116/28 R |
| 4,900,286 A | 2/1990 | Buffalo | |
| 5,232,391 A | 8/1993 | Vaughns et al. | |
| 5,549,940 A | 8/1996 | Noone | |
| 5,935,663 A | 8/1999 | Duzac | |
| 6,102,768 A | 8/2000 | Cho | |
| 6,298,590 B1 * | 10/2001 | Levinson | 40/591 |
| 6,682,117 B1 * | 1/2004 | Sloan et al. | 296/37.9 |

\* cited by examiner

*Primary Examiner*—Cassandra Davis
(74) *Attorney, Agent, or Firm*—Stiennon & Stiennon

(57) ABSTRACT

A two-dimensional figure display device supports an animal or figure silhouette with loose appendages, such as a dog's ears and tongue, on the exterior of a vehicle rear window. The image of the figure to be simulated is formed on a stiffening support. The support has an upwardly extending clip which engages between the window and the window frame of the moving vehicle, a two part hook and loop fastener secures the lower portion of the support to the window. Loose flaps of material attached to the support are acted upon by the wind as the vehicle travels, simulating movement of the depicted figure.

2 Claims, 3 Drawing Sheets

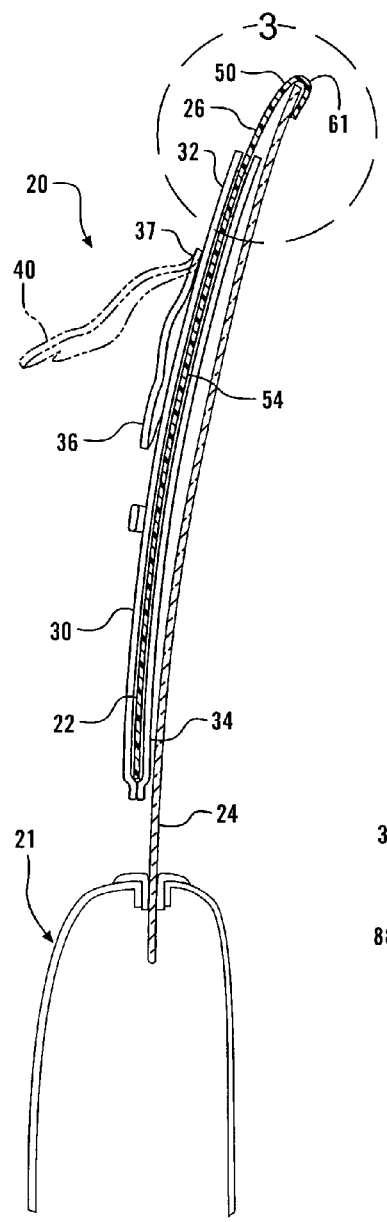
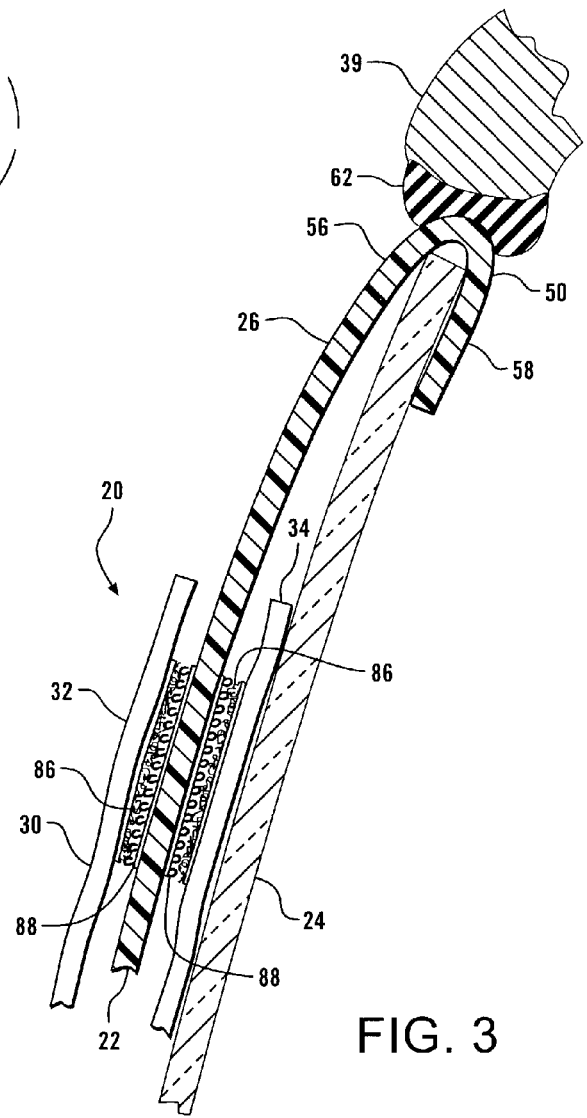
FIG. 2
FIG. 3

AUTOMOTIVE WINDOW NOVELTY FIGURE

CROSS REFERENCES TO RELATED APPLICATIONS

This application is a continuation-in-part of application Ser. No. 09/849,066, filed May 4, 2001, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to vehicle-mounted novelty items.

Automobile drivers view their cars as an extension of themselves. For some, the choice of vehicle itself is an expression of personality. Others choose to display items on their vehicles that depict or represent some part of their personality. Particularly subtle vehicle design cues, or overall similarities in popular vehicle designs may contribute to the desire of a vehicle owner to individualize the appearance of an automobile. Vehicle-mounted displays allow drivers to make a statement about their interests and likes by personalizing their cars in an easily reversible fashion.

Numerous display devices have been developed to address the need to decorate a vehicle without making permanent alterations. Signs, such as "Baby on Board," have been attached to the vehicle interior with a suction cup, as have plush figures, fuzzy dice, letters, inflatable items, air fresheners, and team flags. One desirable feature in an attractive vehicle mounted display is the element of surprise. Because a vehicle is often glimpsed only momentarily, or fleetingly, as it passes, and sometimes only in the peripheral vision, the mind of the observer will attempt to assign meaning to a display based on only very fragmentary sensory input. Hence, the opportunity exists to present a vehicle display which will induce feelings of delight or surprise in the casual viewer, while also giving ready expression to a driver's personality.

SUMMARY OF THE INVENTION

A two-dimensional figure display device supports an animal or figure silhouette with loose portions, such as a dog's ears and tongue, on the exterior of a vehicle rear window. The image of the figure to be simulated may be printed directly on a stiff support. The support has an upwardly extending clip which engage between the window and the window frame of the moving vehicle. Loose flaps of material attached to the support are acted upon by the wind as the vehicle travels, simulating the movement of the depicted figure.

The display simulates a dog, animal figure, human celebrity, or other figure perched in the vehicle back seat, enjoying the air from an open window. This figure display gives drivers an opportunity to express their love and appreciation for pets or personalities to others. Other drivers, giving only partial attention to the ornamentation of passing vehicles, may express surprise or delight, on realizing that what at first appeared to be a dog gazing out a window, is only a largely two dimensional simulation. Furthermore, the display can serve to invite camaraderie between people on the road—one dog lover would recognize another.

It is an object of the present invention to provide a figure display for attachment to a vehicle window which simulates a figure, such as a dog, sitting in the rear of a car.

It is a further object of the present invention to provide a figure display which, although mounted to the exterior of a vehicle, appears to cross over the boundary between vehicle interior and exterior.

It is another object of the present invention to provide a figure display for attachment to an automobile which utilizes the forward motion of the vehicle to induce simulated animated movement of the figure.

Further objects, features and advantages of the invention will be apparent from the following detailed description when taken in conjunction with the accompanying drawings.

BRIEF DESCRIPTION OF THE DRAWINGS

FIG. 2 is a cross-sectional view of the novelty item of FIG. 1, shown mounted to the rear passenger side window of an automobile.

FIG. 3 is an enlarged cross-sectional view of the novelty item and window of FIG. 2, taken along line 3.

DESCRIPTION OF THE PREFERRED EMBODIMENTS

Figure 1:
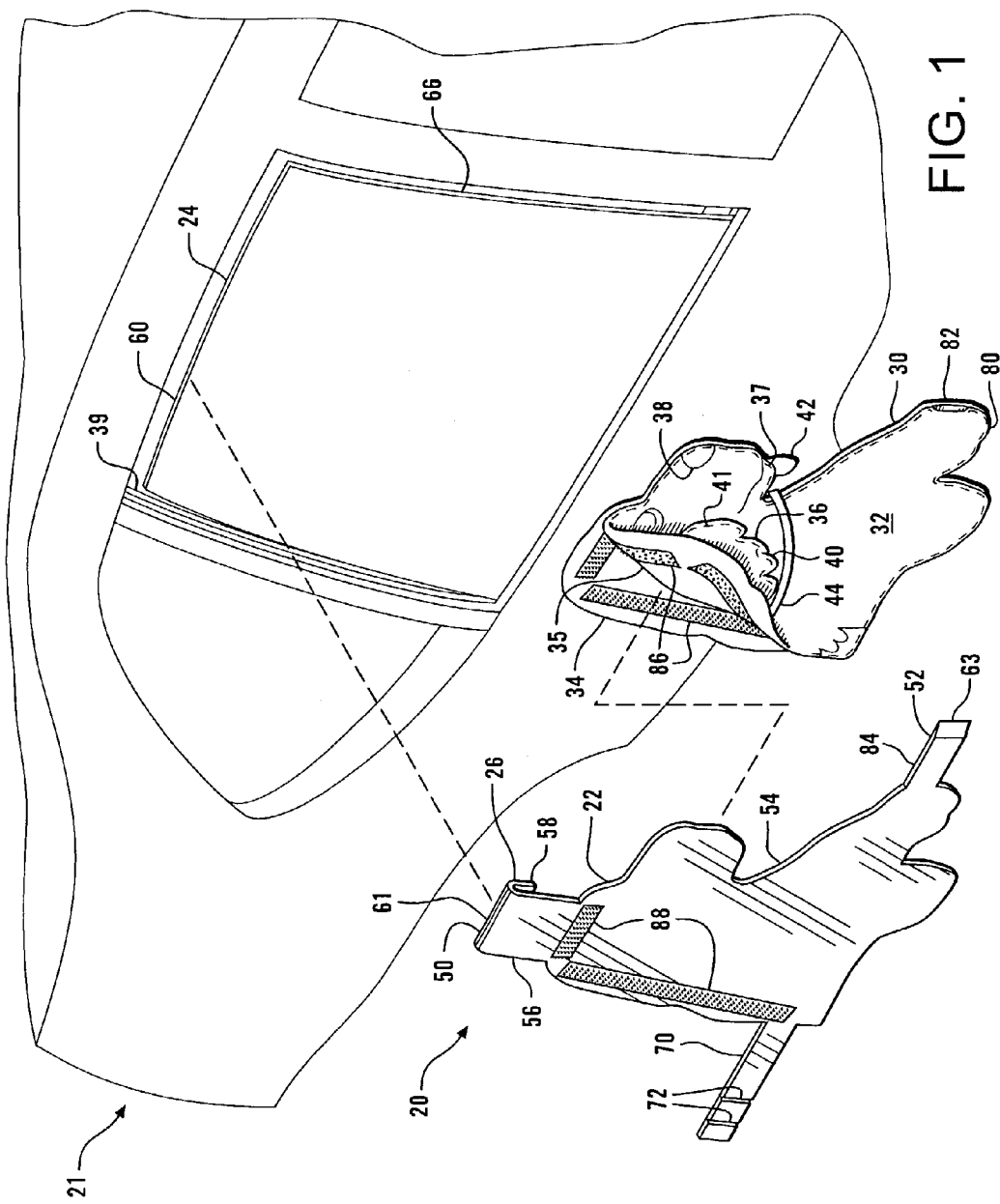
FIG. 1 is an exploded isometric view of one embodiment of the vehicle-mounted novelty item of this invention, shown in relation to a vehicle window.

Referring more particularly to FIGS. 1–4, wherein like numbers refer to similar parts, a vehicle-mounted novelty item or figure display device 20 is shown in relation to a conventional automobile 21 in FIGS. 1–3. The device 20 has two principal components: a multi-layered case element 30, upon which the details of the figure are formed, and a flexible but generally stiffer plastic support 22 which has structure for attachment to the automobile 21. The support is preferably formed of a transparent plastic material, for example, ⅛ thick acrylic. Because the support 22 is essentially a plate, with minimal relief, it is advantageously cut to present a recognizable silhouette of the figure to be simulated. For example, as shown in FIG. 1, the support 22 may be cut, such as by routing, to present the image of a forward looking dog with its paws extending over the edge of a partially opened vehicle rear window. The support 22 presents the outline or general form of the simulated figure, while the case element 30 provides the color, texture, and markings that distinguish the figure. The support 22 is preferably formed to have a slight curvature about a horizontal axis, as indicated in FIG. 2. To manufacture the support, a planar sheet of plastic material may be first cut to the desired silhouette, and then the desired curvature imposed on the cut element, such as by heating and bending. This curvature helps to retain the support engaged against an automobile window when attached. In addition, the resilience of the plastic material from which the support is formed allows the curvature to adjust somewhat to different window curvatures.

The multi-layered element 30 is made from a flexible material, such as woven or non-woven fabric, vinyl, or other printable sheet material. The case element 30 has a front panel 32 which is fastened to a back panel 34 to define a pocket 35 which receives the plastic support 22. A desired figure simulative image 38, such as a dog's profile, is applied to the front panel 32. The image 38 may be applied through screen process printing, embroidery, applique, or other printing process.

In addition, one or more loose flaps of material 36 are attached to the front panel 32. The flaps 36 are connected along seams 37 which define hinges about which the flaps are able to move. The rear window of an automobile extends generally parallel to the flow of air past the vehicle when the vehicle is in motion. When the case element 30 is affixed to the support 22, and the support is mounted to the window 24 of an automobile 21, the flaps 36 move in the wind as the vehicle travels, the airflow acting on the planar flaps of material 36 causes them to repeatedly lift and drop. Attached at various positions along the front panel 32, the flaps 36 may also be printed or decorated to present the appearance of movable portions of the simulated figure. The flaps will generally be simulative of natural appendages of a depicted or simulated animal. For example, one flap 36 defines a dog's ear 40, and another the protruding tongue 42 of a dog. The simulated ear 40 may have two seams, an upper seam 37 along the top of the ear, as shown in FIG. 2, and a front seam 41 along the front of the simulated ear flap. By adjusting the length and positioning of the seams, the degree of movement of the flap may be adjusted. In addition, a simulated dog's collar 44 may be sewn at two ends, to permit the collar to move somewhat in the wind. This positioning of the device 20 in the flow of air passing along the automobile when the automobile is moving causes the figure display device to move in a way which simulates the action of wind on a dog leaning out an open automobile window.

Because the case element 30 and the attached flaps 36 are thin sheets of fabric or like material, it is necessary to provide a stiff backing to prevent the entire figure from waving in the wind like a flag. The support 22, although sufficiently resilient to allow it to be bent slightly to conform to the curvature of the vehicle window 24, as shown in FIGS. 2 and 3, is also sufficiently rigid to resist the forces of the oncoming wind.

The support 22 is releasably, and nondestructively, attached to the vehicle window 24, and engaged between the window and the vehicle window frame 39. The support 22 is connected to the window 24 by a securing connector 26, which preferably comprises a top clip 50 and a front tab 52. The top clip 50 extends upwardly from the body 54 of the support 22. The top clip 50 may be integrally molded with the body 54, or, where different properties are desired, or to achieve economies of manufacture, the top clip 50 may be a separate part fastened to the body as by adhesive attachment. The top clip 50 has an outward segment 56 which overlies the exterior face of the window 24, and an interior segment 58 which is connected to the outward segment by a curved segment 61, and which extends along the interior of the window 24. The interior segment 58 converges towards the outward segment 56, thereby releasably clamping the clip 50 and the attached support 22 to the vehicle window 24. To attach the support to the vertically adjustable window 24, the window glass is lowered to present a gap above and on the front edge of the window to receive the top clip 50 and the front tab 52. When the window is then adjusted upwardly, the clips are fastened in place by being engaged between the window glass and the window frame. The top clip extends upwardly from the support to engage the window, and to hang the support from the window on the exterior of the window.

The top clip 50 prevents the figure 20 from moving downwardly. Moreover, the top clip 50 extends in a front-to-back direction approximately 2¾ inches, and is clasped between the upper edge 60 of the window glass and the rubber window seal 62 fixed to the window frame. This engagement serves to restrict the rotating or tipping of the figure 20 about the top clip 50. In addition, the securing connector 26 may include the front tab 52 which extends frontwardly from the body 54 and which has a forward bevel 63 at about 45 degrees, which engages at the front joint 66 where the window glass is received within the front portion of the window frame, such that the front tab 52 may be engaged between the window glass 24 and the window seal 62. The side window glass in many automobiles, such as the window 24, will often have a convex curve about a generally horizontal axis. The flexibility of the support plastic, and the support at the top and the front of the device 20 enable the device and the figure depicted to generally conform to the curve of the window.

It will be noted that the positioning of the figure on the vehicle window is with respect to the upper edge of the window and the forward edge of the window. Thus, a single support 22 may be adequately installed on a wide variety of vehicle types. Moreover, because of the resilience of the body 54, the support 22 is conformable to the curvature of the window glass, which typically will vary from vehicle to vehicle.

To contribute to the illusion of the figure extending outwardly from within the vehicle, the support 22 may be provided with a decorative edge strip 70, as shown in FIG. 1, which extends rearwardly from the body 54 towards the rear limit of the window 24. The edge strip 70 is preferably formed as a one inch tall transparent rectangle of plastic. The image on the case element 30 is positioned to appear to be extending over the edge strip 70, as if leaning out through a window opening above the top edge of a lowered window. The transparent edge strip 70 simulates the appearance of the window glass. However, for optimal illusory effect, the edge strip should extend rearwardly to close proximity to the rear margin of the window frame. Although the edge strip 70 may be engaged in some sliding arrangement with the body 54 of the support 22, in a preferred embodiment the edge strip is an integral portion of the support 22 and has spaced vertical grooves 72 which define lines of weakened material. The purchaser may then configure the device 20 to fit the window of a particular vehicle by breaking off portions of the edge strip 70 rearward of the optimal vertical groove 72.

To secure the case to the support, the front panel 32 and the back panel are sewn together at a seam 80 which extends only partially around the support. The seam 80 may be provided with a strip opening 82 through which a front decorative edge strip 84 may project from the body of the support. The front tab 52 may be positioned on the forward end of the front edge strip 84. The edges of the front panel 32 and the back panel 34 which are not sewn together are provided with the loop elements of a hook and loop fastener 86. Hook elements 88 of a hook and loop fastener are adhesively attached to the front and the rear surfaces of the support 22. The hook and loop fastener elements on the front panel 32 and back panel 34 are then connected to the elements on the support 22 to secure the case to the support and restrict the tendency of the material to flutter in the wind. This attachment approach facilitates manufacture of the cases separate from the support, and their rapid attachment to the supports. However, other attachment approaches may be employed, such as sewing the front panel to the back panel around the entire perimeter of the support, gluing the front panel and back panel to the support, use of snap fasteners, zippers, and other fastening means. Alternatively, hook and loop fasteners elements may be placed on the rear panel and the front panel of the case to be connected directly to one another, rather than attaching to the support itself.

The display device 20 may be constructed in two versions, one for attachment to the passenger side rear window, as shown in the figures, and another which is a mirror image of the first, for attachment to the driver's side rear window. The display 20 is designed to be placed toward the front edge of the rear window so as to minimize the obstruction of the window. Moreover, the device 20 does not hinder the closing of the window to which it is mounted.

The display device provides a means for allowing people to express their love and appreciation for dogs or other animals to others. In addition, it would invite camaraderie between people on the road—one dog lover would recognize another.

It should be noted that the case may be imprinted with a variety of designs to simulate different breeds of dogs, other pets, wild animals, celebrities, fictional characters, and the like. Although some supports may present a common profile which may be used with different case images, often a different support and profile will be required with a different case design.

Moreover, the back panel 34 of the multi-layered element 30 may also be imprinted or have formed thereon a figure corresponding to the one on the front panel 32. In this way the figure, in addition to being visible to those exterior to the vehicle, can also be seen by the vehicle's passengers. In addition, the multi-layered element also provides opportunities for attaching messages, such as, for example, attaching a tag to the simulated dog collar around a dog's neck. The tag could have the mark or logo of a popular sports team, or some other product or association of interest to the owner.

Figure 4:
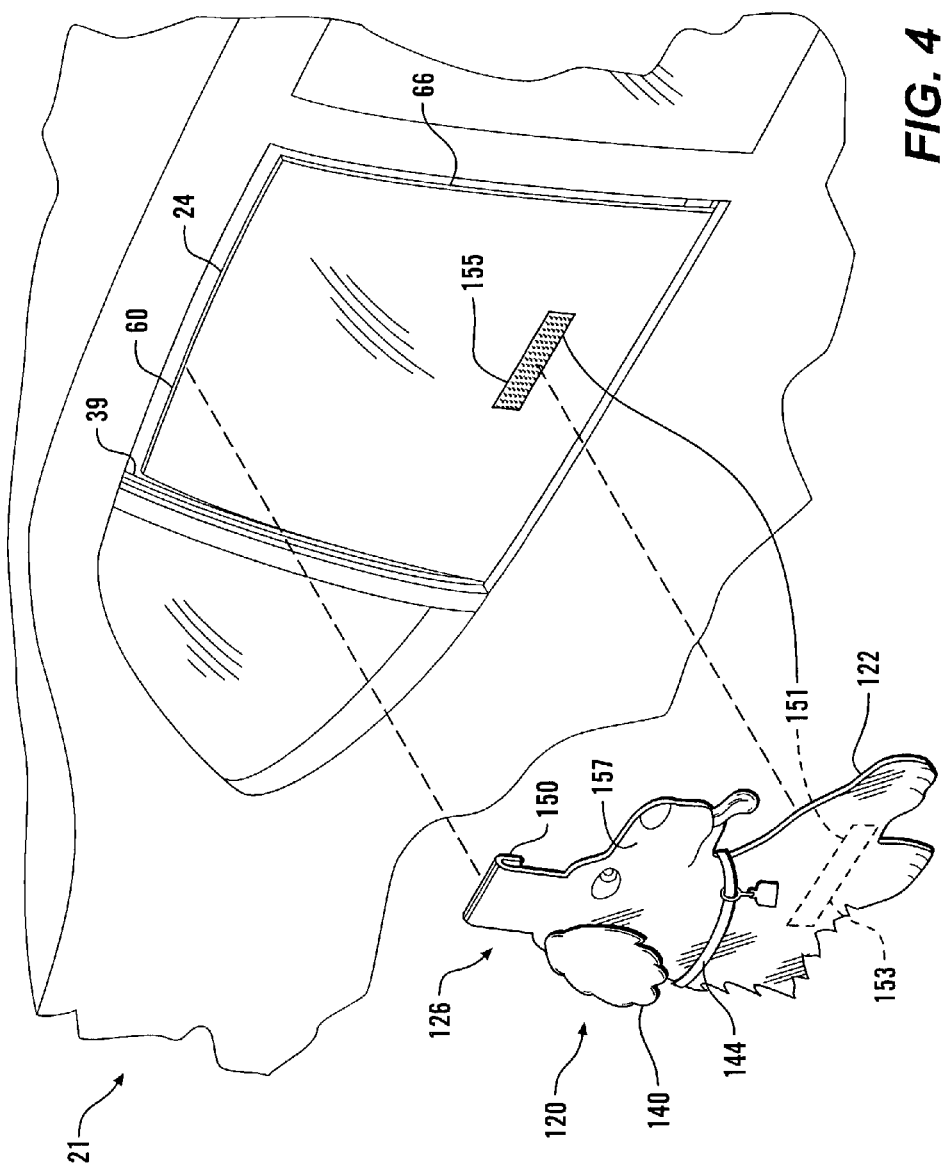
FIG. 4 is an exploded isometric view of an alternative embodiment vehicle-mounted novelty item of this invention, shown in relation to a vehicle window.

An alternative embodiment display 120 is shown in FIG. 4. The display 120 has a support 122 which may be formed of a polycarbonate material. The support 122 is connected to the window 24 by a securing connector 126, which preferably comprises a top clip 150 and a two part hook and loop fastener 151, such as VELCRO fastener from Velcro Industries B.V. The fastener 151 comprises a first strip 153 which is affixed to the rear surface of the support 122, and a second strip 155 which is connected by a pressure sensitive adhesive to the vehicle window 24. The fastener strips 153, 155, may be about 1½ inches high, and extending about two to three inches in the front to back direction. The top clip 150 is similar to the top clip 50 discussed above. The hook and loop fastener 151 is located below the level of the top clip, and serves to restrain the support from separating from the window. The artwork or indicia 157 representing the animal or other figure which is to be simulated by the display is formed directly onto the support 122, for example by screen printing, or by attachment of a preprinted decal, or the like.

A flap 140 representing a dog's ear or other loose feature is affixed to the support 122. Likewise, the display may be provided with a dog's collar 144. It should be noted that the support 120 may be formed with an edge strip similar to the strip 70 shown in FIG. 1, to simulate the appearance of an open window over which the figure is leaning. Hence, any of the displays of this invention may be provided with the hook and loop fastener arrangement for restraining the lower portion of the support in engagement with the window.

It is understood that the invention is not limited to the particular construction and arrangement of parts herein illustrated and described, but embraces such modified forms thereof as come within the scope of the following claims.

We claim:

1. A display for attachment to a window of an automobile, the window being vertically adjustable within a vehicle window frame, the display comprising:
    a vertically extending support positionable on an exterior of the window, to be positioned in a flow of air passing along the automobile when the automobile is in motion;
    a clip extending upwardly from the support to engage the window, and to hang the support from the window on the exterior of the window;
    indicia applied to the support to simulate the appearance of a figure; and
    a flap connected to the support, the flap having portions which are moveable with respect to the support in the flow of air, such that the flap moves as the automobile travels;
    a first segment of hook and loop fastener material affixed to a rear surface of the support at a position located downwardly of the clip; and
    a second segment of hook and loop fastener material affixed to the window to engage with the first segment of hook and loop fastener material to retain the support adjacent to the window.

2. A figure display for attachment to a motor vehicle window, the display comprising:
    a support positioned exterior to the vehicle window;
    portions of the support which extend upwardly to define a clip for engagement with a top edge of the motor vehicle window;
    a first segment of hook and loop fastener material affixed to a rear surface of the support at a position located downwardly of the clip;
    a second segment of hook and loop fastener material affixed to the window to engage with the first segment of hook and loop fastener material to retain the support adjacent to the window; and
    figure-simulative indicia connected to the support for presenting to spectators exterior to the motor vehicle, and a first flap connected to the support.

* * * * *